UNITED STATES PATENT OFFICE.

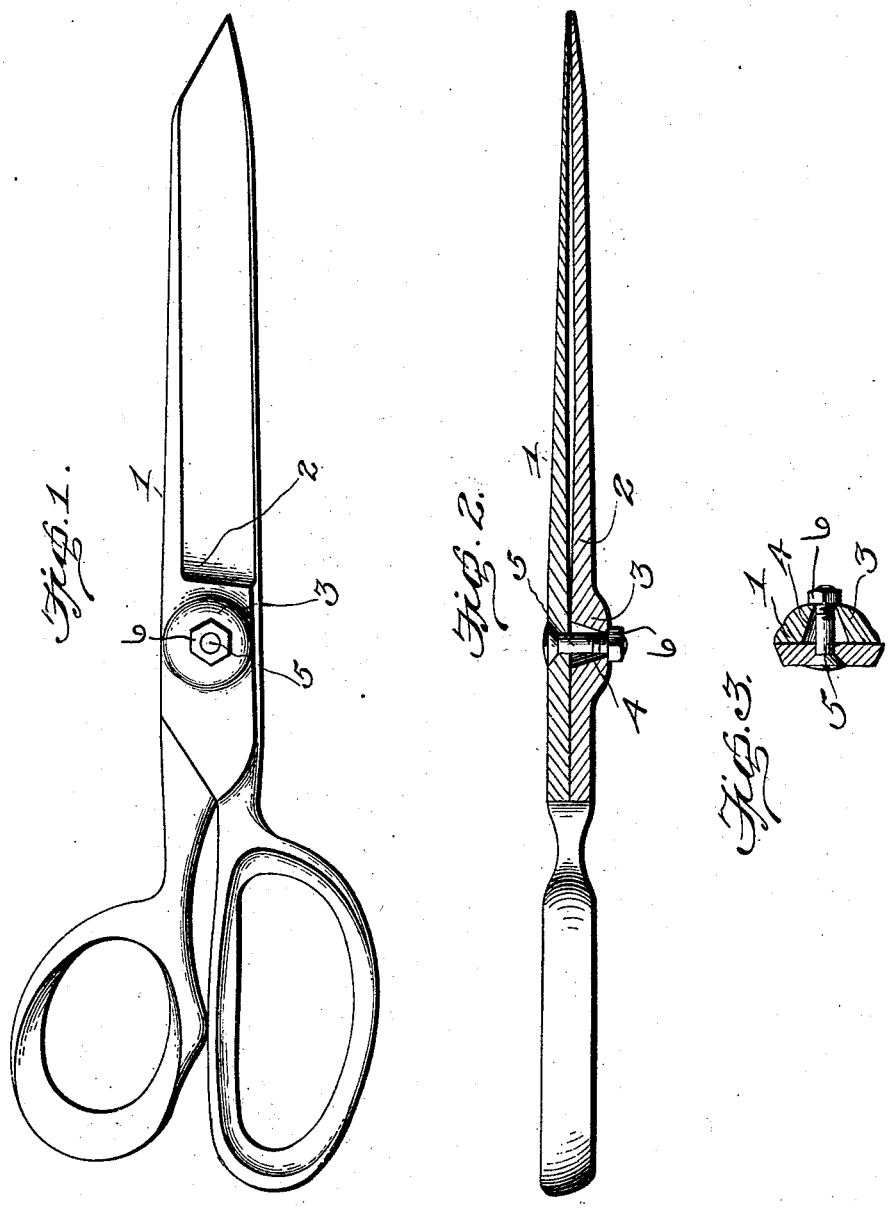

JESSE C. GREENFIELD, OF MACON, MISSOURI.

SHEARS.

No. 842,650.   Specification of Letters Patent.   Patented Jan. 29, 1907.

Application filed May 14, 1906. Serial No. 316,836.

*To all whom it may concern:*

Be it known that I, JESSE C. GREENFIELD, a citizen of the United States, residing at Macon, in the county of Macon and State of Missouri, have invented certain new and useful Improvements in Shears; and I do declare the following to be a full, clear, and exact description of the invention, such as will enable others skilled in the art to which it appertains to make and use the same.

This invention relates to improvements in shears.

The object of the invention is to provide a pair of shears having means whereby the cutting edges of the blades will be thrown together in operative position when brought in contact with the goods to be cut, thereby providing for the engagement of the blades to form a clean cut.

With the above and other objects in view the invention consists of certain novel features of construction, combination, and arrangement of parts, as will be hereinafter described and claimed.

In the accompanying drawings, Figure 1 is a side view of a pair of shears constructed in accordance with the invention. Fig. 2 is a longitudinal sectional view through the blades of the same; and Fig. 3 is a cross-sectional view through the blades, taken on a line with the pivot-bolt therein.

Referring more particularly to the drawings, 1 denotes a pair of shears which may be of any construction. One of the blades 2 of the shears is provided with an increased thickness adjacent to the pivotal engagement with the other blade, as shown at 3. In the enlarged or thickened portion 3 of the blade is formed a pivot-hole 4, said hole being larger on the inner side of the blade than on the outer side and tapered gradually from said inner side toward the outer side of the blade, as shown. The pivot-bolt 5 is preferably rigidly connected with the opposite blade of the shears and projects through the tapered pivotal hole in the enlarged portion 3 of the other blade and is provided on its projected end with a washer and nut 6, which may be of the usual or any suitable construction.

By providing a tapered pivot-hole in one of the blades of the shears, as herein shown and described, said blade will be slightly rocked when engaged with the material to be cut, thereby bringing the cutting edges of the blades into proper position to form a clean cut, the rocking movement of the blade being caused by the resistance of the material being cut.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A pair of shears having one of its blades provided with a cone-shaped pivot-hole, the base of which is disposed on the inner side of the blade.

2. A pair of shears having one of its blades provided with a cone-shaped pivot-hole, the base of which is disposed on the inner side of the blade, and its other blade provided with a rigid cylindrical pivot-bolt to engage the said hole, and means for holding the blades assembled.

3. A pair of shears having one of its blades provided with an enlargement on its outer side having therein a cone-shaped pivot-hole, the base of which is disposed on the inner side of the blade and its other blade provided with a rigid true cylindrical pivot-bolt to engage the said hole, and a nut engaging the pivot-bolt for holding the blades assembled.

In testimony whereof I have hereunto set my hand in presence of two subscribing witnesses.

JESSE C. GREENFIELD.

Witnesses:
H. W. DONEGHY,
J. C. SCHWEIKHAUS.